United States Patent Office 3,409,508
Patented Nov. 5, 1968

3,409,508
METHOD FOR ANALYSIS OF UREA IN
BIOLOGICAL FLUIDS
Leonard A. Hughes, Oakland, Calif., assignor, by mesne
assignments, to Nuclear-Chicago Corporation, Des
Plaines, Ill., a corporation of Delaware
No Drawing. Filed Jan. 26, 1966, Ser. No. 523,023
5 Claims. (Cl. 195—127)

This invention relates to an improved method for analysis of urea in biological fluids such as blood serum or plasma or urine.

The usual methods for analysis of urea are:

(1) Nesslerization.

(2) Reaction with diacetyl compounds. (These methods (1) and (2) involve boiling and complicated analytical procedure and are not adapted to rapid analysis.)

(3) Employing the specific enzyme urease to convert urea to carbon dioxide and ammonia, and determining the liberated ammonia by one of several methods, the most sensitive being the Berthelot reaction, first described in 1859. In this reaction, ammonia and phenol in the presence of hypochlorite produce a blue color with intensity proportional to the amount of ammonia present. This third method, especially when used with the Berthelot reaction, is an improvement over the prior methods because of its specificity for urea, because the sensitivity of the test requires only small samples, and because it avoids boiling or poisonous reagents.

Some improvements and changes have been made in the third method. Thus, M. M. Murray in J. Biochem., 19:294, 1925, first reported that sodium nitroferricyanide (also called sodium nitroprusside) could be used as a catalyst in the Berthelot reaction to speed the conversion of ammonia to indophenol, the color end point. Since then Chaney and Marbach, Clin. Chem., 8:131, 1962, have reported a modified form of this method (cf. U.S. Patent No. 3,119,751) that is currently rather widely used. However, their two principal reagents—a buffered urease solution and a mixture of nitroferricyanide and phenol—are quite unstable in their working solutions. Hence, they have to be supplied as solids and mixed shortly before use. Their method is thus not suitable for use by individual physicians and is suitable only for well-equipped laboratories, and even there has serious disadvantages, because it is relatively slow.

Conventional measuring methods have been cumbersome, slow, and difficult for all but technically trained people. Also, no prior-art method enables the rapid processing of large numbers of samples.

One object of the present invention is to provide accurate determination of urea, especially in biological fluids, from stable reagents which require no reconstitution for actual use.

Another object is to provide a more accurate and more rapid method for urea determination.

Another object is to provide a procedure for urea determination capable of easy and efficient performance by people with little, if any, technical training in laboratory procedures and with only a few pieces of equipment.

Another object is to provide new stable reagents for use in urea determination.

Another object is to provide a simple foolproof technique which results in high degrees of accuracy, even with unknown samples as small as 13 microliters.

It is a further object of this invention to provide a complete system for determination of urea.

Other objects and advantages of the invention will appear from the following description of a preferred embodiment.

The reagents used in this invention are: (1) aqueous urease and nitroferricyanide catalyst, stabilized with a glycol and buffered for optimum enzyme activity, (2) alkali-metal phenate solution, and (3) alkali-metal hypochlorite solution.

The reagent comprising the mixture of buffered urease and nitroferricyanide in glycol is new, and it is especially important in the present invention. The formulation provides stability, so that the reagent can be kept for months, and the preparation is ready for use without further dilution. Also, the mixture may be freezer-stored without solidification and kept that way indefinitely without deterioration. Nitroferricyanide is unstable when in contact with phenol and water, so one advantage of the new reagent is that the nitroferricyanide and phenol are kept separate until the actual tests are run. In the new reagent, the small amount of nitroferricyanide catalyst in no way interferes with the enzyme activity of the urease; in fact, the urease and nitroferricyanide keep at least as well together, when stabilized by glycol, as they do separately.

The other two reagents are not new in themselves. The second reagent, dilute alkali-metal phenate, has been used previously in such tests. It may readily be made by mixing phenol with sodium hydroxide in the ratio of approximately 2:1 in water, the final concentration preferably being about 3% sodium phenate, though more concentrated or more dilute solutions may be used. This reagent is stable at room temperature and may be kept indefinitely.

The third reagent is alkali-metal hypochlorite, such as sodium hypochlorite, in approximately 3% solution. It is also stable and easily kept. The reagent, of course, may be more or less dilute.

The process of the invention includes other novel features forming significant parts of the present invention. Extremely small quantities of unknown samples are used, typically 20 microliters. Ordinarily, the measurement and manipulation of such small samples would be difficult but in this invention measurement of the sample is accomplished by filling microcapillary tubes known to contain a precise volume. Further, the contents of the microcapillary tube containing the serum are washed out by capillary action and surface tension, by using a larger diameter second capillary tube containing the measured amount of enzyme reagent. For further refinement, the above manipulation results in delivery of the serum and enzyme reagent into a calibrated cuvette, so that after the initial reaction is complete (by incubation at either room temperature or a higher temperature), the second reagent is added to a calibration mark on the cuvette. After that or at the same time, the hypochlorite is added, a single drop being sufficient, and exact measurement of that reagent not being critical. Further incubation is done, and after the reaction is complete, final dilution by water is made to a second calibration mark. The cuvette may then be inserted into a colorimeter to determine optical density of the blue color for a quantitative reading.

EXAMPLE (A) Preparation of reagents (1) A stabilized buffered urease enzyme and nitroferricyanide reagent may be prepared by dissolving 2400 Sumner units of urease, such as Sigma Urease IV, in 630 ml. of 0.08 N phosphate buffer, pH 6.5. Ethylene glycol (or other glycol) is added to make a volume of one liter. Then 0.8 gm. of alkali-metal (e.g., sodium) nitroferricyanide is added. The solution will keep for months and will keep indefinitely in a freezer.

(2) Sodium phenate: 31 gm. of liquefied phenol (88%) is added to 875 ml. of water and followed by 125 ml. of 10% sodium hydroxide. The solution is stable.

(3) Sodium hypochlorite: 600 ml. of 5% solution may be diluted to one liter with water. The solution is stable.

(4) Urea standard: 1.29 gm. urea is dissolved in one liter of saturated solution of benzoic acid. (This is equivalent to 60 mg. of urea nitrogen per 100 ml.) This also is stable.

(B) Diagnostic test (1) A control sample of reagent 4 above, the urea standard, is measured by a microcapillary tube—e.g., 20 microliters in a tube 40 mm. long. Exactly the same size samples of blood serum or plasma or of diluted urine are measured in other identical microcapillary tubes.

(2) The urease enzyme (reagent 1 above) is measured into a series of microcapillary tubes—e.g., each holding 125 microliters, 90 mm. long.

(3) With the lower end of each sample microcapillary tube against the wall of a calibrated cuvette, then the lower end of an enzyme microcapillary tube is placed in contact with the upper end of the sample tube. Surface tension and capillary action drain both microcapillary tubes and their contents flow to the bottom of the cuvette. A series of cuvettes, one for each sample, are in this way supplied with these initial ingredients.

(4) The mixture is incubated—typically 20 minutes at 37° C. or 6 minutes at 55° C., or 40 minutes at room temperature.

(5) Sodium phenate solution (reagent 2 above) is added to a first calibration mark on each cuvette (about 1.3 ml.).

(6) One drop of sodium hypochlorite (reagent 3 above) is added to each cuvette.

(7) The mixture is incubated—typically 15 minutes at 37° C. or 4 minutes at 55° C., or 30 minutes at room temperature.

(8) The resulting incubated solution has an intense blue color. It is diluted with water to a second mark (approx. 8.0 ml.) on the cuvette to bring optical density within a suitable range.

(9) By processing the control, containing a known concentration of urea, simultaneously with the unknown samples in a colorimeter simple calculations give the actual values for the unknown samples. Alternately, my prior invention, application Serial No. 427,808, filed Jan. 25, 1965, using a calibrated read-out meter specially made for the testing enables the user to obtain the result without any calculations.

I claim:

1. A reagent combination for the analysis of urea in biological fluids, comprising:
   a first vial containing an aqueous solution of buffered urease, a stabilizing amount of glycol, and nitroferricyanide,
   a second vial containing an aqueous solution of alkali-metal phenate, and
   a third vial containing an aqueous solution of alkali-metal hypochlorite.

2. The reagent combination of claim 1 wherein the phenate in said second vial is sodium phenate, and the hypochlorite in said third vial is sodium hypochlorite.

3. The reagent combination of claim 1 wherein:
   said first vial contains an aqueous solution of one part by weight of urease, 630 parts by weight of 0.08 N phosphate buffer solution, 400 parts by weight of ethylene glycol, and one part by weight of alkali-metal nitroferricyanide.
   said second vial contains a 3% aqueous solution of sodium phenate, and
   said third vial contains a 3% aqueous solution of sodium hypochlorite.

4. A reagent for urea analysis comprising a buffered solution of urease and nitroferricyanide containing a stabilizing amount of glycol.

5. A stable reagent for urea analysis, comprising one part by weight of urease dissolved in 630 parts by weight of 0.08 N phosphate buffer, 400 parts by weight of glycol, and one part by weight of sodium nitroferricyanide.

References Cited
UNITED STATES PATENTS 3,119,751  1/1964  Chaney _____ 195—103.5

ALVIN E. TANENHOLTZ, *Primary Examiner.*